March 5, 1968   M. L. ALCORN, JR   3,371,680
DOUBLE PLUG VALVE
Filed Dec. 15, 1964   2 Sheets-Sheet 1
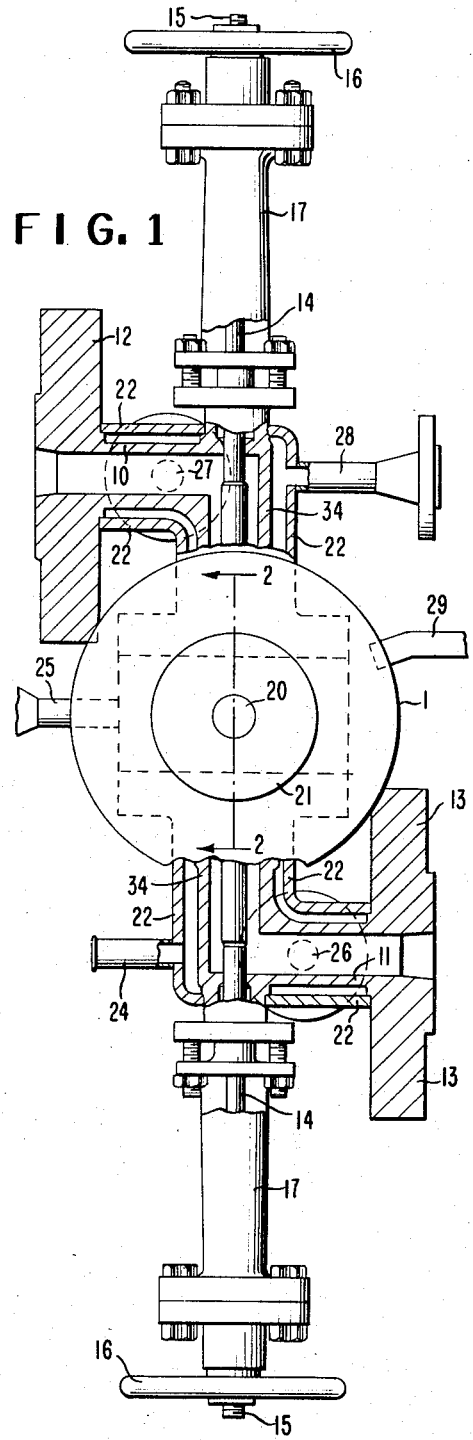
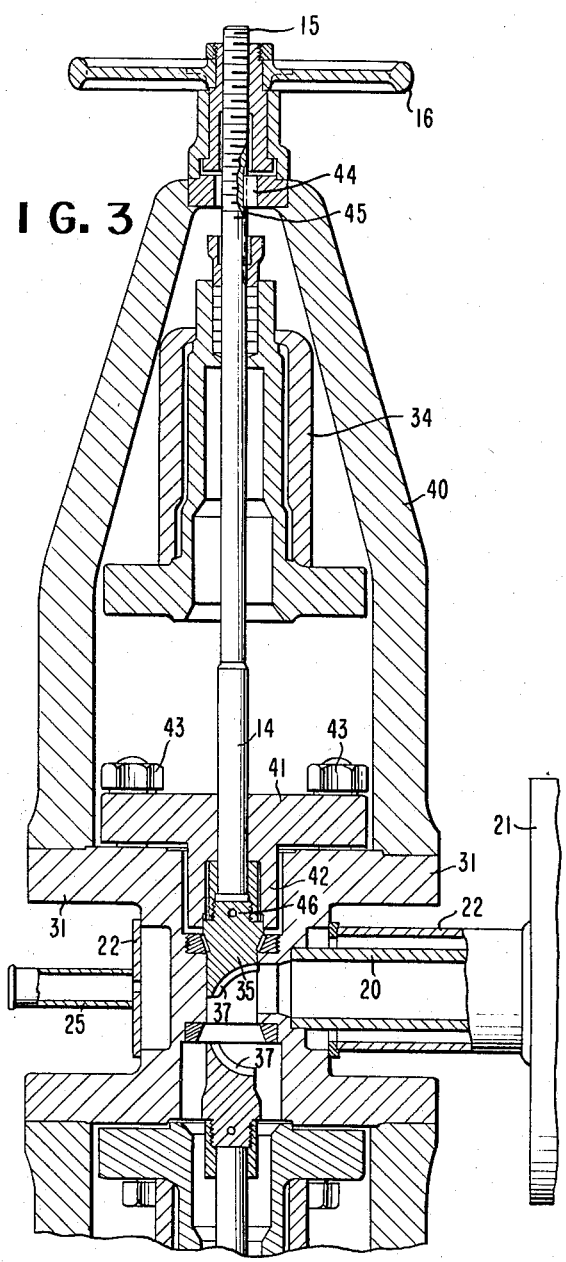
INVENTOR
MAURICE LEE ALCORN, JR.
BY *Norris E. Rackman*
ATTORNEY

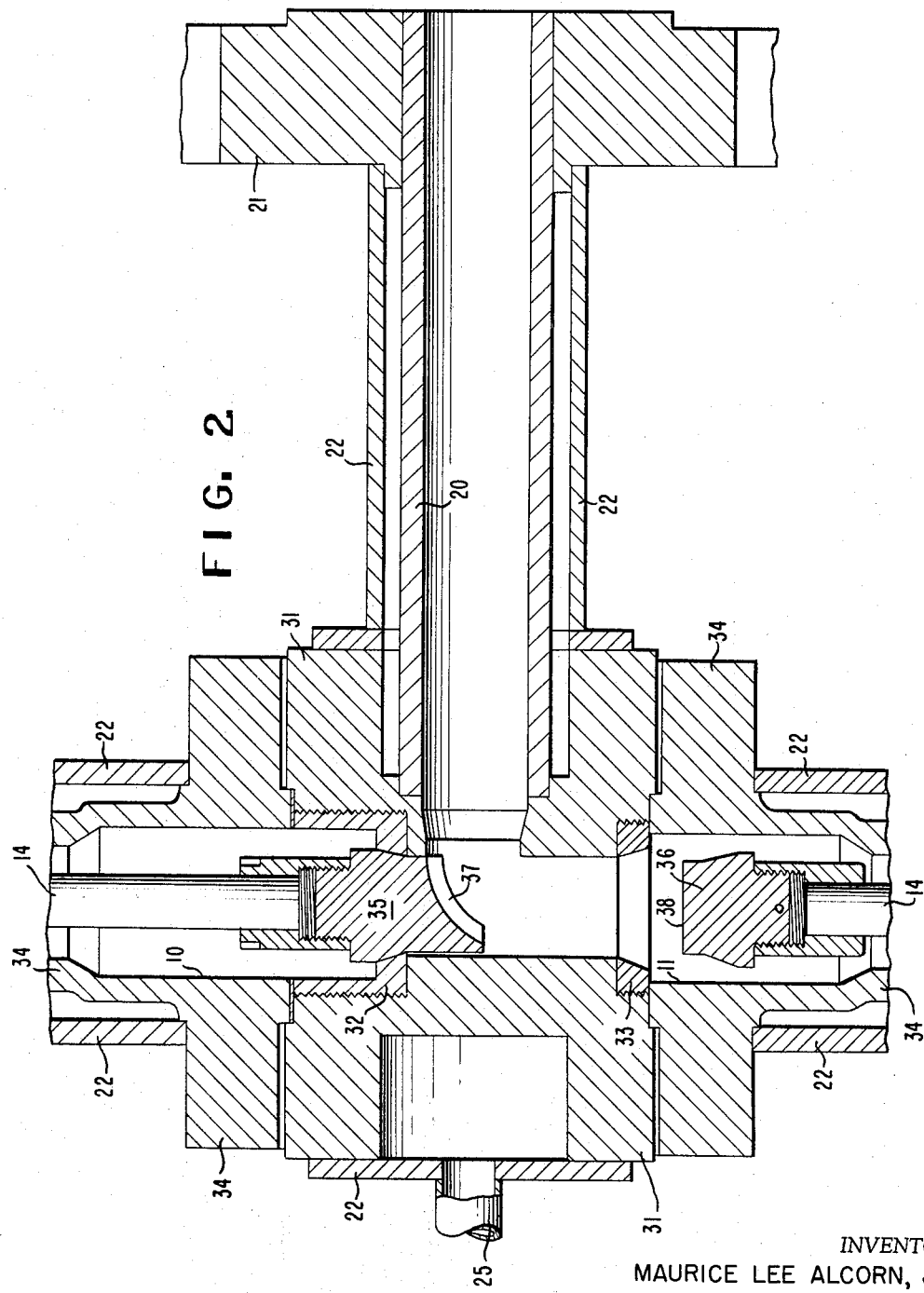

# United States Patent Office 3,371,680
Patented Mar. 5, 1968

3,371,680
DOUBLE PLUG VALVE
Maurice Lee Alcorn, Jr., Greenville, N.C., assignor to
E. I. du Pont de Nemours and Company, Wilmington,
Del., a corporation of Delaware
Filed Dec. 15, 1964, Ser. No. 418,435
3 Claims. (Cl. 137—340)

ABSTRACT OF THE DISCLOSURE

A jacketed double-plug valve for handling high-melting-point viscous fluids, one valve and the adjacent outlet conduit are capable of being cleaned out without disrupting the flow through the other conduit. The valve disclosed comprises a valve body with an entry conduit and two exit conduits, the exit conduits having tapered solid plug-type valves with the valve stem located in the respective discharge flow paths, a bonnet assembly connected to the discharge conduit covers each valve, a tall yoke encases each bonnet assembly, and is connected to the valve body and clamping means are provided for holding the plug in a closed position while the associated bonnet and yoke are removed for cleaning purposes.

---

This invention is concerned with a novel multiple-outlet valve for handling of high-melting-point, viscous fluids, especially molten organic polymer materials.

The problems encountered in transporting high-melting organic polymers in fluid form are well-known in the art. Many fiber- or film-forming polymers, for example, rapidly degrade to a darkened, infusible solid at the temperatures necessary for satisfactory transfer in a pipeline. Special precautions are necessary to avoid holdup of polymer in even a very small, quiet pocket in lines conveying such fluid. Temporary holdup can lead to subsequent contamination of a large amount of molten material as the degraded portion is moved back into the main stream of flow. It is desirable, therefore, to eliminate pockets of little or no flow in lines transporting viscous, heat-labile fluids and to take special precautions to avoid interruption of flow.

This invention provides a multi-way, jacketed valve which is essentially free of quiet pockets in normal use, and which provides for segregation of off-standard fluid and for directing satisfactory fluid through an alternate path to subsequent processing without interruption of flow. Furthermore, the invention provides a valve construction which can readily be cleaned of off-standard material as required while maintaining process continuity.

The stated advantages are achieved in the valve of this invention which comprises a valve body having one inlet and two outlets, the outlets being equipped with tapered seats for receiving a mating tapered plug for restriction of egress of fluid from said body, each outlet further being fitted with a rising-stem plug to mate with said tapered seat supported in a tall-yoke, off-stream port assembly of the type described herein which serves selectively to restrict or to receive and direct the process fluid from said body towards subsequent processing, said off-stream ports and the valve body being jacketed for accommodation of a heat transfer fluid to maintain the process fluid in a suitably molten condition, the plug of at least one of said off-stream port assemblies being elongated so as to extend beyond its mating seat and to provide within said valve body a contoured path, free of potentially stagnant spaces, from the inlet through at least one outlet.

In the accompanying drawing, which illustrates specific embodiments of the invention, FIGURE 1 is a top plan view of one form of valve, shown in partial cross section taken along the longitudinal axis of the discharge conduits, FIGURE 2 is a vertical sectional detail of the central portion of the valve, the section being taken along line 2—2 of FIGURE 1, and FIGURE 3 is a vertical sectional view of an alternate valve construction, the section being taken along the axis of the valve stems and along the axis of the inlet conduit, the location of the section in the central portion of this figure corresponding to that of FIGURE 2.

Referring to FIGURE 1, the valve assembly has two outlet conduits 10 and 11, terminating in flanges 12 and 13, respectively, for connection to subsequent piping. Dual valve-control mechanisms are shown, at top and bottom, each comprising a valve stem 14 terminating in a threaded portion 15 and actuated by handwheel 16, the stem extending from the handwheel through a yoke 17 to the central portion of the valve assembly shown in FIGURE 2. An inlet conduit 20 terminates in a flange 21 for connection to supply piping. The inlet and outlet conduits, and the valve assembly, are provided with jacket means 22 for circulation of heat-transfer fluid, as for maintaining molten polymer at the required temperature. Pipes 24, 25, 26, 27, 28, and 29 are used for circulating the heat-transfer fluid through the jacket means.

Referring to FIGURE 2, valve body 31 is provided with valve seats 32 and 33. Each outlet conduit 10, 11 extends from a bonnet assembly 34 which mates with the valve body around the corresponding valve seat to form a tight seal. Each valve stem 14 passes through one of the conduit bonnets to a valve block, 35 and 36, which cooperates with the corresponding valve seat to prevent flow through that conduit when in the closed position. Valve block 35, shown in the closed position, has a portion which extends into the inlet conduit and has an arcuate face 37 for providing a smooth flow around the 90° turn from inlet conduit 20 into outlet conduit 11. This contoured path is free from potentially stagnant spaces. Valve block 36 is normally in the open position during operation, as shown, to provide for flow into outlet conduit 11. However, this valve can be closed and valve block 35 moved to the open position to direct off-standard polymer into outlet conduit 10. The provision of a contoured path is not necessary for this purpose, so valve block 36 has a flat face 38.

FIGURE 3 shows an embodiment in which both valve blocks have faces 37 shaped to provide smooth flow and eliminate holdup pockets. This embodiment also illustrates a valve construction which makes it easy to clean one outlet conduit while continuing flow into the other outlet conduit. An unusually tall yoke 40 is provided to support the upper end of valve stem 14 and handwheel 16. The bonnet 34 can be disconnected from the valve body and slid upward on the valve stem to the position shown. A slotted clamping member 41 can then be substituted in the position normally occupied by the bonnet. This clamping member has projecting portions 42 which engage the valve block 35 to hold it in the closed position when pressure is applied by tightening nuts 43 against the clamping member 41, as shown in the drawing. The handwheel 16 can then be removed, the yoke 40 can be unbolted from the valve body, and the yoke and bonnet assembly can be slid off the end of the valve stem.

FIGURE 3 illustrates positive means for maintaining the valve blocks in proper rotational position with the shaped faces aligned as shown. A key 44 is secured to the yoke which engages longitudinal slot 45 in the valve stem to keep the stem from turning. The valve block 35 is screwed onto the end of the stem and a pin 46 is inserted through the block and the stem to keep the block properly aligned. Other details of the valve construction will be readily understood from the drawing.

The valve of this invention resolves several problems in handling of molten, heat-labile polymers for which solutions have long been sought. At start-up, for example, polymer is diverted from its normal path to a conveniently located take-off, such as outlet conduit 10 in FIGURE 1, until measured properties indicate satisfactory polymer quality. At this time the contoured plug of the take-off is seated and the other plug is withdrawn, admitting satisfactory polymer to subsequent processing stages. Thus non-standard polymer is eliminated at a convenient stage in the process without endangering quality of the subsequent satisfactory polymer by interruption of flow. The discharge port is then cleared of polymer before it has excessively heat-degraded by stagnant heating, using the following procedure which does not require interruption of process flow:

With reference to FIGURE 3, which is pictured as after step 4, below, (1) Bonnet 34 is disconnected from the heat exchange fluid supply and return lines and from the process flow discharge line.

(2) Nuts 43 are removed.

(3) The bonnet is pushed away from valve body 31, exposing stem 14 adjacent thereto.

(4) Slotted clamp assembly 41 is installed on the valve body, replacing the bonnet, and closing force is applied by replacing nuts 43.

(5) Handwheel 16 is removed, yoke 40 unbolted from the valve body, and the yoke and bonnet are slid off the end of the stem.

(6) Bonnet 34 is cleaned and steps 1–5 are reversed to reassemble the valve for further use as, for example, in dumping of the system at the end of a run.

It will be apparent that the novel valve of this invention is useful in alternative services such as, for example, in supplying molten, high-melting materials to several subsequent process steps in parallel. In this service its major advantage is in permitting interruption of one or more parallel steps without disturbing the others. It will be obvious that by following the cleanout procedures described above the interrupted step can also be restarted at a later time without disturbing those which do not otherwise require stopping. The full benefit of this invention will be realized in this type of use by suitable contouring of extensions on all plugs as is indicated in FIGURE 3.

Since it will be obvious to one skilled in the art that the many specific applications of the valve of this invention may require minor deviations in structural detail for best utility in a given use, it is intended that such equivalent embodiments be considered within the scope of the invention claimed below.

I claim:

1. A multiple-outlet valve apparatus for handling high-melting point, viscous fluids which comprises a body member, a fluid inlet conduit in the body member, two fluid outlets in the body member opening into opposite sides of the inlet conduit, a bonnet member removably secured to the body member over each of said fluid outlets, an outlet conduit extending from each bonnet member and communicating with the fluid opening within the bonnet, jacket means surrounding said conduits and bonnet members for circulation of heat-transfer fluid, and plug-type valves for closing and opening said fluid outlets independently; each of said valves including a valve seat located in one of said outlets, a solid tapered plug block mating with the valve seat, a valve stem attached to the plug block and extending through the bonnet member, a yoke for supporting and positively holding in a selected position the outer end of the valve stem, and means for moving the valve stem in and out along the longitudinal axis of the valve stem to operate the valve and to positively and forcibly hold the plug-type valve in a closed nonleakable position; at least one of said plug blocks including a shaped portion extending into said inlet conduit when the valve is in the closed position, said shaped portion of the plug block being contoured to provide smooth flow from the inlet conduit into the opposite fluid outlet and to eliminate potentially stagnant spaces.

2. An apparatus as defined in claim 1 which includes positive means for maintaining said shaped portion of the plug block in proper rotational relationship, said means comprising a longitudinal slot in the valve stem at the yoke end and key means secured to the yoke for engaging the longitudinal slot to keep the stem from rotating during operation of the valve.

3. An apparatus as defined in claim 1 wherein said yoke is removably secured to said body member and is sufficiently tall to provide for sliding said bonnet member along said valve stem to a position well clear of the body member while maintaining the valve closed and means for clamping the valve plug block in the closed position to provide removal of the yoke and body member from the valve stem for cleaning purposes.

References Cited

UNITED STATES PATENTS

| | | | |
|---|---|---|---|
| 1,044,259 | 11/1912 | Schiller | 251—270 X |
| 1,047,774 | 12/1912 | Eynon et al. | 137—614.18 |
| 1,923,306 | 8/1933 | Hagen | 251—318 |
| 1,986,206 | 1/1935 | Kennedy | 137—625.26 |
| 2,015,024 | 9/1935 | Yarnall | 137—340 |
| 2,019,193 | 10/1935 | Mueller | 251—269 X |
| 3,194,267 | 7/1965 | Lyon et al. | 137—625.23 X |
| 3,237,642 | 3/1966 | Tomson | 137—608 |

FOREIGN PATENTS

| | | |
|---|---|---|
| 14,286 | 1913 | Great Britain. |
| 278,814 | 10/1914 | Germany. |

M. CARY NELSON, *Primary Examiner.*

S. SCOTT, *Assistant Examiner.*